United States Patent
Grimes et al.

(10) Patent No.: US 9,779,247 B2
(45) Date of Patent: Oct. 3, 2017

(54) BOOT CONTROL SYSTEMS AND METHODS FOR VEHICLES

(71) Applicants: GM Global Technology Operations LLC, Detroit, MI (US); Freescale Semiconductor, Inc., Austin, TX (US)

(72) Inventors: Michael R. Grimes, Saline, MI (US); Richard Soja, Austin, TX (US)

(73) Assignees: GM Global Technology Operations LLC, Detroit, MI (US); Freeescale Semiconductor, Inc., Austin, TX (US)

(*) Notice: Subject to any disclaimer, the term of this patent is extended or adjusted under 35 U.S.C. 154(b) by 145 days.

(21) Appl. No.: 14/725,387

(22) Filed: May 29, 2015

(65) Prior Publication Data

US 2016/0350536 A1 Dec. 1, 2016

(51) Int. Cl.
*G06F 21/57* (2013.01)
*G06F 21/34* (2013.01)
*G06F 21/71* (2013.01)

(52) U.S. Cl.
CPC ........... *G06F 21/575* (2013.01); *G06F 21/34* (2013.01); *G06F 21/71* (2013.01); *G06F 2221/033* (2013.01)

(58) Field of Classification Search
CPC ........ G06F 21/34; G06F 21/575; G06F 21/71; G06F 2221/033
See application file for complete search history.

(56) References Cited

U.S. PATENT DOCUMENTS

| | | | | |
|---|---|---|---|---|
| 4,817,040 A * | 3/1989 | Bodley-Scott | ........... | H04Q 9/00 340/459 |
| 6,643,574 B1 * | 11/2003 | Swart | ....................... | H04L 67/12 280/735 |
| 7,584,350 B2 * | 9/2009 | Kuhls | ....................... | G06F 8/65 713/1 |
| 8,036,786 B2 * | 10/2011 | Kimoto | ....................... | G06F 8/65 701/1 |
| 8,589,793 B2 * | 11/2013 | Link, II | ................. | B60K 35/00 381/86 |
| 8,966,248 B2 * | 2/2015 | Baltes | .................... | H04L 9/3247 713/155 |
| 9,253,200 B2 * | 2/2016 | Schwarz | ................ | G06F 3/0484 |
| 9,374,335 B2 * | 6/2016 | Burcham | ................ | H04L 51/38 |
| 9,436,456 B2 * | 9/2016 | Danne | ..................... | G06F 8/665 |
| 2013/0268754 A1 * | 10/2013 | Baltes | .................... | H04L 9/3247 713/156 |
| 2015/0154113 A1 * | 6/2015 | Krieger | .................... | G06F 8/665 711/103 |
| 2016/0264071 A1 * | 9/2016 | Ujiie | ..................... | B60R 16/023 |

* cited by examiner

*Primary Examiner* — Abdelmoniem Elamin

(57) ABSTRACT

A hardware security module (HSM) transitions a first signal from a first state to a second state and transitions a second signal from a first state to a second state when a request to change boot code is received. In response to receipt of a boot request, the HSM, when the first signal is in the first state and the second signal is in the first state: does not execute the hash function; and maintains the second signal in the first state. An actuator control module, in response to the receipt of the boot request: executes the boot code when the second signal is in the first state; and does not execute the boot code when the second signal is in the second state.

18 Claims, 4 Drawing Sheets

BOOT CONTROL SYSTEMS AND METHODS FOR VEHICLES

FIELD

The present disclosure relates to vehicle control systems and methods and more particularly to secure boot control systems and methods for vehicles.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle includes various control modules that control various vehicle systems, respectively. For example only, an engine control module (ECM) controls an engine system of the vehicle, a transmission control module (TCM) controls a transmission system of the vehicle, etc.

A first control module may receive a signal from a sensor while a second control module does not receive the signal from the sensor. The first control module may determine a parameter while the second control module does not determine the parameter. The control modules of the vehicle may communicate via one or more serial data buses, such as a controller area network (CAN) bus. The control modules may communicate to, for example, share data that is received or determined by one control module but that is not received or determined by one or more other control modules.

SUMMARY

In a feature, a boot control system is disclosed. A hardware security module (HSM) transitions a first signal from a first state to a second state and transitions a second signal from a first state to a second state when a request to change boot code is received. In response to receipt of a boot request, the HSM: (i) when the first signal is in the second state: executes a hash function on the boot code to produce a hash value; transitions the first signal from the second state to the first state when the hash value is equal to a predetermined value; and transitions the second signal from the second state to the first state when the hash value is equal to the predetermined value; and (ii) when the first signal is in the first state and the second signal is in the first state: does not execute the hash function; and maintains the second signal in the first state. An actuator control module, in response to the receipt of the boot request: executes the boot code when the second signal is in the first state; and does not execute the boot code when the second signal is in the second state.

In further features, the actuator control module controls one or more actuators of the vehicle after executing the boot code.

In further features, when the first signal is in the first state and the second signal is in the second state, the hardware security module: executes the hash function on the boot code to produce a hash value; and transitions the second signal from the second state to the first state when the hash value is equal to the predetermined value.

In further features, when the hash value is not equal to the predetermined value, the hardware security module maintains the second signal in the second state.

In further features, when the hash value is not equal to the predetermined value, the hardware security module indicates that a fault is present in the boot code.

In further features, a monitoring module illuminates a malfunction indicator lamp (MIL) when the hardware security module indicates that the fault is present in the boot code.

In further features, a power module supplies power to the hardware security module before supplying power to the actuator control module.

In further features, the hardware security module maintains the second signal in the first state until a second request to change the boot code is received.

In further features, the hardware security module receives the request to change the boot code from a device that is independent of the vehicle via a physical input/output port of the vehicle.

In further features, the hardware security module receives the request to change the boot code from a device that is independent of the vehicle via a wireless transceiver.

In a feature, a boot control method includes: using a hardware security module, when a request to change boot code is received: transitioning a first signal from a first state to a second state; and transitioning a second signal from a first state to a second state. The method further includes, using the hardware security module, in response to receipt of a boot request: (i) when the first signal is in the second state: executing a hash function on the boot code to produce a hash value; transitioning the first signal from the second state to the first state when the hash value is equal to a predetermined value; and transitioning the second signal from the second state to the first state when the hash value is equal to the predetermined value; and, (ii) when the first signal is in the first state and the second signal is in the first state: not executing the hash function; and maintaining the second signal in the first state. The method further includes, using an actuator control module, in response to the receipt of the boot request: executing the boot code when the second signal is in the first state; and not executing the boot code when the second signal is in the second state.

In further features, the method further includes actuating one or more actuators of the vehicle after executing the boot code.

In further features, the method further includes, when the first signal is in the first state and the second signal is in the second state: executing the hash function on the boot code to produce a hash value; and transitioning the second signal from the second state to the first state when the hash value is equal to the predetermined value.

In further features, the method further includes, when the hash value is not equal to the predetermined value, maintaining the second signal in the second state.

In further features, the method further includes, when the hash value is not equal to the predetermined value, indicating that a fault is present in the boot code.

In further features, the method further includes illuminating a malfunction indicator lamp (MIL) in response to the indication that the fault is present in the boot code.

In further features, the method further includes supplying power to the hardware security module before supplying power to the actuator control module after receiving the boot request.

In further features, the method further includes maintaining the second signal in the first state until a second request to change the boot code is received.

In further features, the method further includes receiving the request to change the boot code from a device that is independent of the vehicle via a physical input/output port.

In further features, the method further includes receiving the request to change the boot code from a device that is independent of the vehicle via a wireless transceiver.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A control module of a vehicle executes boot code before beginning normal operation. For example, an engine control module (ECM) executes the ECM's boot code before starting an engine when a user requests engine/vehicle startup.

Before executing the boot code, the control module may execute a hash function on the boot code to determine a hash value. The control module may begin executing the boot code after verifying that the hash value is the same as a predetermined hash value for the boot code. This allows the control module to verify the reliability of the boot code before executing the boot code. When the hash value is different than the predetermined hash value, the control module may disable execution of the boot code.

Executing the hash function and verifying the reliability of the boot code, however, takes time. The period necessary to execute the hash function and to verify the reliability of the boot code may increase, for example, as the complexity of the hash function increases and/or as the memory space occupied by the boot code increases, and vice versa.

According to the present disclosure, a control module executes the hash function on the boot code and verifies that the resulting hash value is the same as the predetermined value only after a request is received to change the boot code. When a request to change the boot code has not been received since the boot code was last verified, the control module begins executing the boot code without executing the hash function and re-verifying the reliability of the boot code. In instances when a request to change the boot code has not been received, this may decrease the period between when a boot request is received and when execution of the boot code begins.

Figure 1:
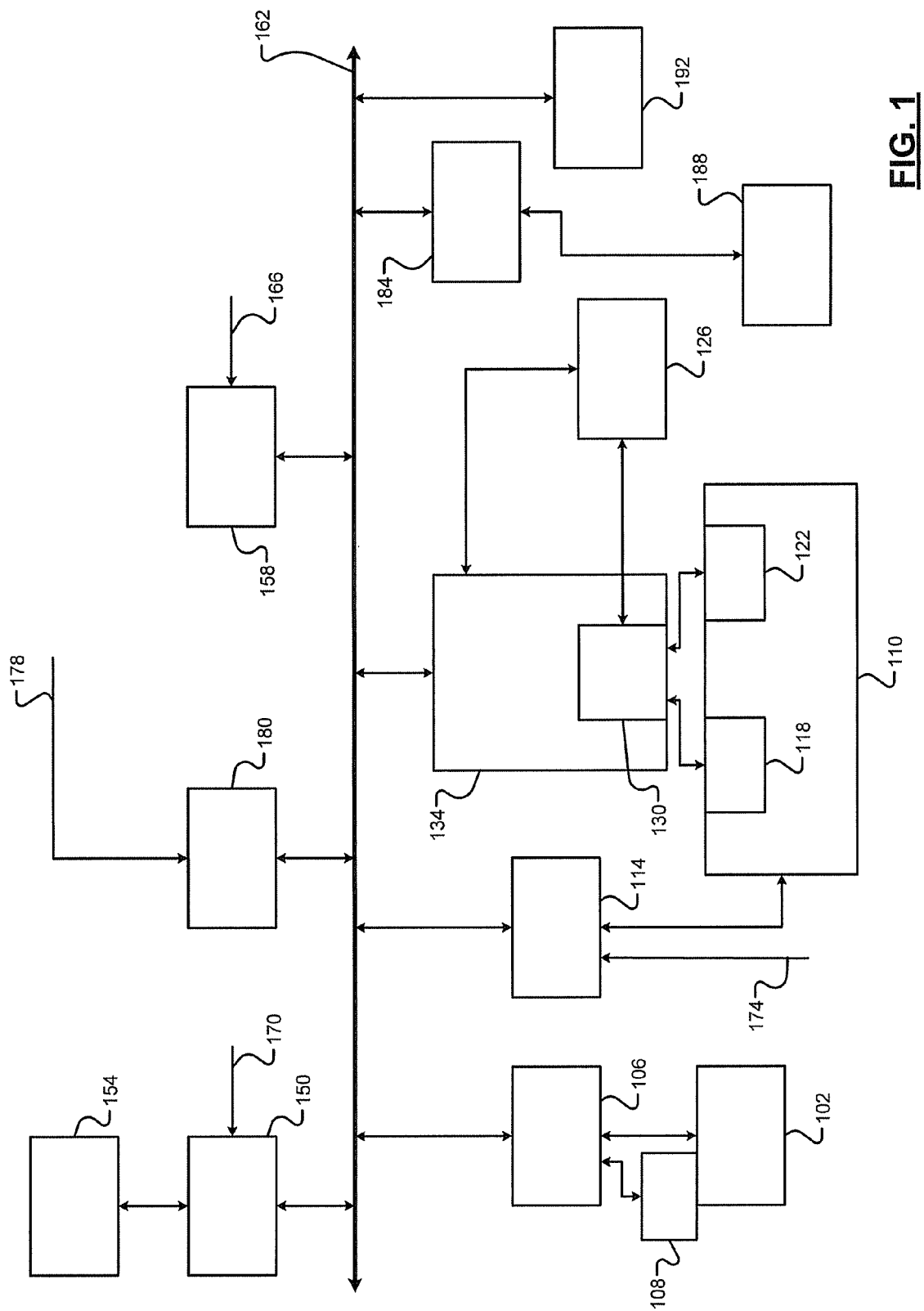
FIG. 1 is a functional block diagram of an example vehicle system according to the present disclosure.

Referring now to FIG. 1, a functional block diagram of an example control system of a vehicle is presented. While a hybrid vehicle is shown and will be described, the present disclosure is also applicable to non-hybrid vehicles. An engine 102 combusts an air/fuel mixture to generate drive torque. An engine control module (ECM) 106 controls the engine 102. More specifically, the ECM 106 controls engine actuators, such as a throttle valve, fuel injectors, spark plugs, cam phasers, and other engine actuators. The ECM 106 also controls engagement of a starter 108 with the engine 102 and the application of power to the starter 108 to start the engine 102.

The engine 102 may output torque to a transmission 110. A transmission control module (TCM) 114 controls operation of the transmission 110. For example only, the TCM 114 may control gear selection within the transmission 110 and one or more torque transfer devices (e.g., a torque converter, one or more clutches, etc.).

The transmission 110 may include one or more motors or motor generator units (MGUs). For example only, a first MGU (MGU-A) 118 and a second MGU (MGU-B) 122 may be included as in the example of FIG. 1. An MGU can act as either a generator or as a motor at a given time. When acting as a generator, an MGU converts mechanical energy into electrical energy. The electrical energy can be, for example, used to charge a battery 126 via a power control device 130. When acting as a motor, an MGU generates torque that may be used, for example, to supplement or replace torque output by the engine 102. In various implementations, a power control device may be provided for each MGU. While MGUs are shown as being implemented within the transmission 110, the present disclosure is also applicable to vehicles having one or more motors and/or MGUs implemented externally to the transmission 110.

A power inverter control module (PIM) 134 may control the MGU-A 118, the MGU-B 122, and the power control device 130. The PIM 134 may be referred to as a transmission power inverter module (TPIM) or a traction power inverter module (TPIM) in various implementations.

An electronic brake control module (EBCM) 150 may control brakes 154 of the vehicle. A user interface module (UIM) 158 provides one or more driver inputs to a controller area network (CAN) bus 162. The CAN bus 162 may also be referred to as a car area network bus. The CAN bus 162 may be a serial data bus. The control modules of the vehicle may communicate with each other via the CAN bus 162.

The driver inputs may include, for example, an accelerator pedal position (APP) 166 and one or more other suitable driver inputs. A brake pedal position (BPP) 170 may be provided to the EBCM 150. The TCM 114 may determine or receive a position 174 of a park, reverse, neutral, drive lever (PRNDL). An ignition state 178 may be provided to a body control module (BCM) 180. At a given time, the ignition state 178 may be one of off, accessory, run, or crank. The BCM 180 may transition the ignition state 178 from off to accessory or crank based on driver actuation of an ignition key, button, or switch.

A vehicle may include one or more additional control modules that are not shown, such as a chassis control module, a battery pack control module, etc. One or more of the control modules may be omitted in various vehicles. The control modules may selectively transmit and receive data via the CAN bus 162. In various implementations, two or more control modules may communicate via one or more additional CAN buses (not shown).

The vehicle also includes an input/output (I/O) port 184, such as an On Board Diagnostics (OBD) port or another suitable type of physical I/O port. An interface device 188 that is independent of the vehicle may be connected to the vehicle via the I/O port 184. When connected, the interface device 188 may, for example, update, delete, or otherwise alter code stored in one or more modules of the vehicle. The vehicle may also include one or more wireless transceivers, such as wireless transceiver 192. One or more external devices may wirelessly connect to the vehicle via a wireless transceiver. When wirelessly connected, an external device may, for example, update, delete, or otherwise alter code stored in one or more modules of the vehicle.

Figure 2:
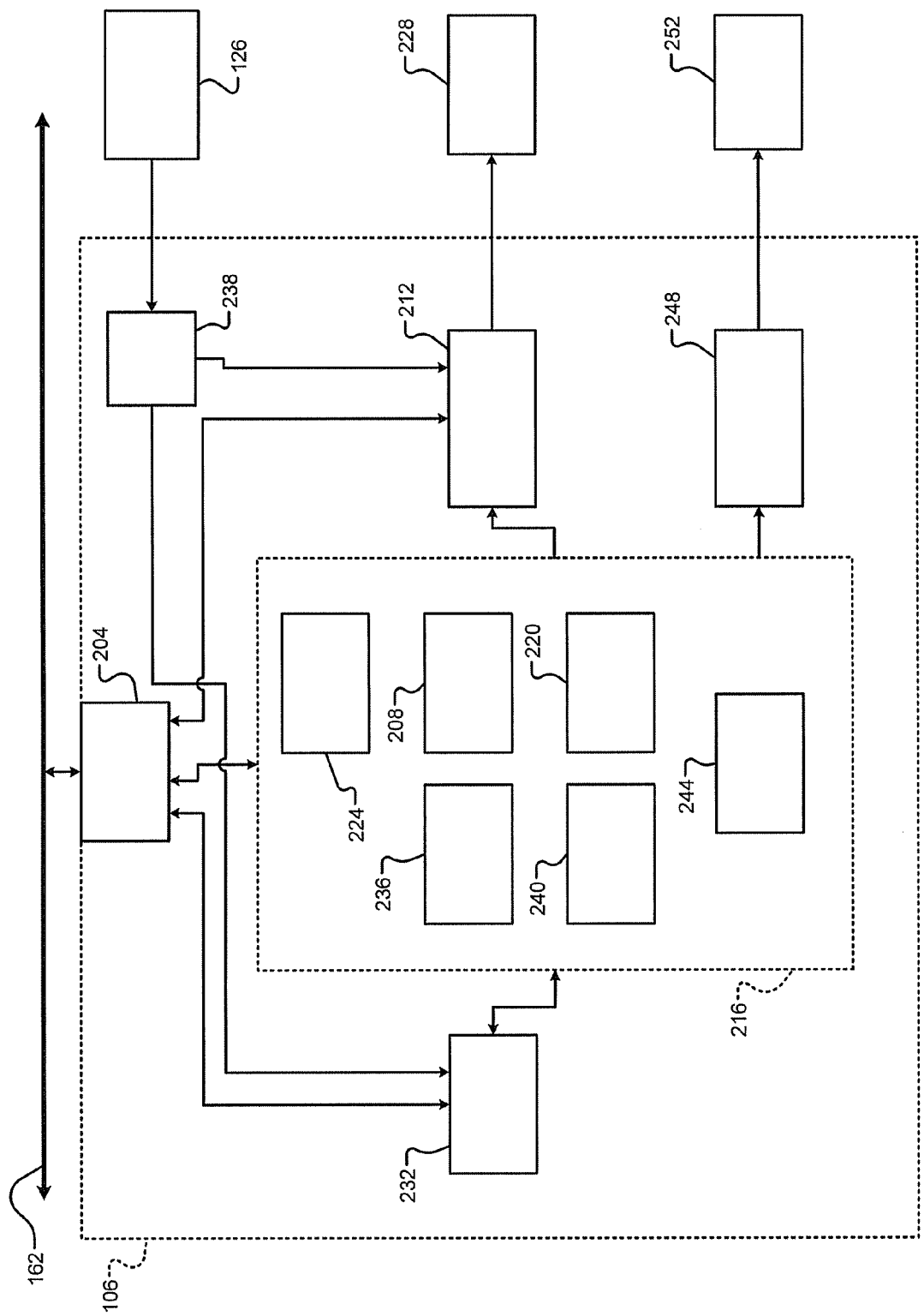
FIG. 2 is a functional block diagram of an example engine control module according to the present disclosure.

Referring now to FIG. 2, a functional block diagram of an example implementation of the ECM 106 is presented. While the present disclosure will be discussed in conjunction with the ECM 106, the present disclosure is also applicable to other control modules of a vehicle, such as the TCM 114, the PIM 134, the EBCM 150, the BCM 180, and the UIM 158. Also, while the present disclosure is discussed in terms of verifying boot code, the present disclosure is also applicable to other types of code whose reliability is verified before being executed.

The ECM 106 communicates via the CAN bus 162 and other communication channels via an input/output (I/O) interface 204. Boot code 208 for an actuator control module 212 is stored in memory 216. When a boot request is received, the actuator control module 212 executes the boot code 208 in response to an allow boot indicator 220 being in a first state. The actuator control module 212 disables execution of the boot code 208 when the allow boot indicator 220 is in a second state. The second state is different than the first state. A boot request may be generated, for example, when a driver actuates an ignition key, button, or switch to start the vehicle or to turn the vehicle on. While the example of disabling execution of the boot code 208 when the allow boot indicator 220 is in the second state has been provided, no action or one or more other actions may be taken, such as illuminating an indicator lamp, preventing the boot code 208 from updating any portion of the memory 216, disabling vehicle operation, etc. The action taken may be selected based on a criticality of the functionality of the associated device.

After executing the boot code 208, the actuator control module 212 executes post-boot code 224. The post-boot code 224 includes code for controlling engine actuators 228, performing diagnostics, and performing other functions.

A hardware security module (HSM) 232 executes HSM code 236 stored in the memory 216 to determine whether to allow or prevent the actuator control module 212 from executing the boot code 208. The HSM 232 sets the allow boot indicator 220 based on the determination. The HSM code 236 is non-modifiable. For example, the HSM code 236 may be stored in a masked read only memory (ROM), a one-time flash memory, or made non-modifiable in another suitable manner.

When a boot request is received, a power module 238 may begin supplying power to the HSM 232 before beginning to supply power to the actuator control module 212. This may enable the HSM 232 to update the allow boot indicator 220 if necessary before the allow boot indicator 220 is checked by the actuator control module 212 to determine whether to execute the boot code 208 is allowed.

A change requested indicator 240 is also stored in the memory 216. To update, delete, or otherwise change the boot code 208, a requesting device transmits a request to change the boot code 208 to the ECM 106. Examples of requesting devices include, for example, the interface device 188 and external devices that connect to the vehicle wirelessly via a wireless transceiver.

The HSM 232 sets the change requested indicator 240 to a first state when a request to change the boot code 208 is received. The change requested indicator 240 being in the first state indicates that some or all of the boot code 208 may have been deleted or otherwise changed since reliability of the boot code 208 was last verified. After setting the change requested indicator 240 to the first state, the HSM 232 allows the requesting device to change the boot code 208. Without a request to change the boot code 208 and after requested changes are complete, the HSM 232 prevents the boot code 208 from being changed. The HSM 232 and the change requested indicator 240 thereby prevent a hardware interlock that prevent the changes to the boot code 208 unless the HSM 232 also changes the change request indicator 240. The change request indicator 240 may only be changeable by the HSM 232.

In addition to setting the change requested indicator 240 to the first state, the HSM 232 also sets the allow boot indicator 220 to the second state when a request to change the boot code 208 is received. When the next boot request is received after the change requested indicator 240 is set to the first state, the HSM 232 executes a hash function on the boot code 208. In various implementations, the next boot may be requested automatically when a requesting device disconnects and/or discontinues its request to change the boot code 208. The actuator control module 212 does not execute the boot code 208 when the allow boot indicator 220 is in the second state.

Code for the hash function is stored in the HSM code 236. Execution of the hash function on the boot code 208 produces a hash value. The HSM 232 compares the resulting hash value with a predetermined value for the boot code 208. The HSM 232 sets the allow boot indicator 220 to the first state when the hash value is the same as (i.e., equal to) the predetermined value. The HSM 232 then maintains the allow boot indicator 220 in the first state until a next time that a request to change the boot code 208 is received. This enables the actuator control module 212 to execute the boot code 208 as boot requests are received without the HSM 232 having to execute the hash function and compare the hash value with the predetermined value for each boot request.

The HSM 232 may maintain the allow boot indicator 220 in the second state when the hash value is not the same as the predetermined value. The hash value not being the same as the predetermined value may indicate that the boot code 208 was improperly changed. As stated above, the actuator control module 212 disables execution of the boot code 208 when the allow boot indicator 220 is in the second state.

The HSM 232 may also set a boot fault indicator 244 to a first state when the hash value is not the same as the predetermined value. The boot fault indicator 244 being in the first state may indicate that a fault is present in the boot code 208. The HSM 232 may set the boot fault indicator 244 to a second state when the hash value is the same as the predetermined value. Code for comparing the hash value with the predetermined value, code for setting the allow boot indicator 220, code for setting the change requested indicator 240, and code for setting the boot fault indicator 244 may be included in the HSM code 236.

A monitoring module 248 may monitor the boot fault indicator 244 and one or more other fault indicators. The monitoring module 248 may initiate one or more remedial actions when the boot fault indicator 244 is in the first state. For example, the monitoring module 248 may illuminate a malfunction indicator lamp (MIL) 252 when the boot fault indicator 244 is in the first state. The illumination of the MIL 252 may indicate that servicing of the vehicle may be needed.

Figure 3:
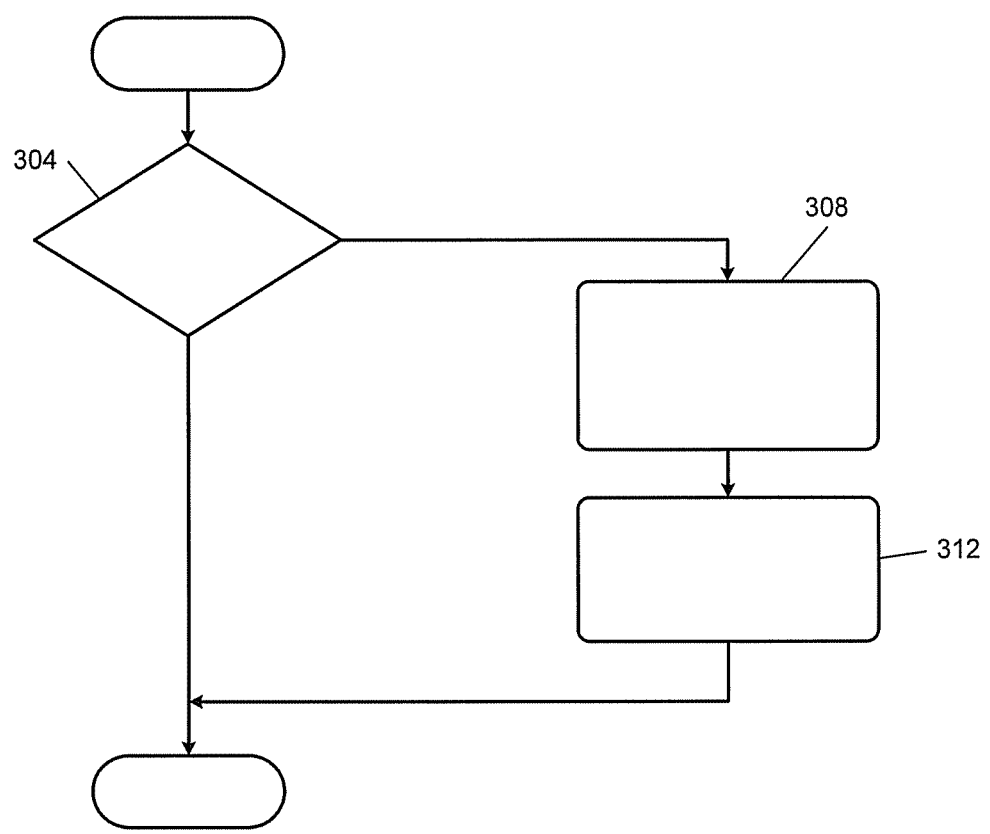
FIG. 3 is a flowchart depicting an example method for requiring verification of reliability of boot code.

FIG. 3 includes a flowchart depicting an example method for requiring verification of reliability of boot code. Control begins with 304 where the HSM 232 determines whether a change request has been received to change the boot code 208. If 304 is false, control may end. If 304 is true, control continues with 308.

At 308, the HSM 232 sets the allow boot indicator 220 to the second state. The actuator control module 212 does not execute the boot code 208 when the allow boot indicator 220 is in the second state. The HSM 232 also sets the change requested indicator 240 to the first state at 308. The change requested indicator 240 being in the first state indicates that the boot code 208 may have been changed since a request to change the boot code 208 has been received. When the change requested indicator 240 is in the first state and a boot request is received, the HSM 232 performs the hash function and sets the allow boot indicator 220 to the second state when the resulting hash value is the same as the predetermined value.

At 312, the HSM 232 allows the device that issued the request to change the boot code 208. In various implementations, a boot request may be generated automatically, via the HSM code 236, when the requesting device disconnects, discontinues the request to change the boot code 208, etc.

Figure 4:
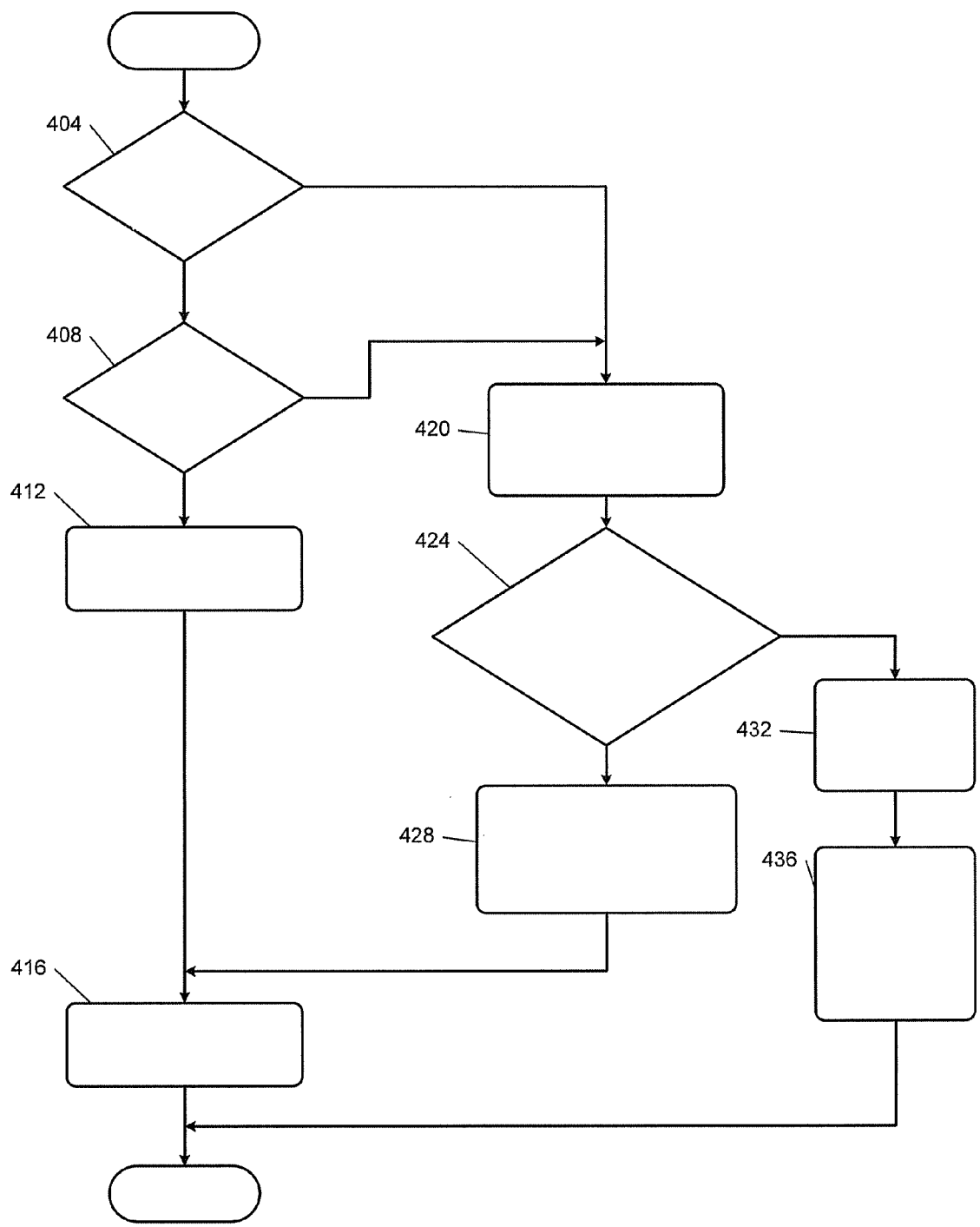
FIG. 4 is a flowchart depicting an example method for executing boot code.

FIG. 4 is a flowchart depicting an example method for executing boot code. Control begins with 404 when a boot request is received, such as when a driver inputs an engine startup request. At 404, the HSM 232 determines whether the change requested indicator 240 is in the first state. If 404 is true, control transfers to 420 as the boot code 208 may have been changed. 420 is discussed further below.

At 408, the HSM 232 determines whether the allow boot indicator 220 is in the first state. If 408 is false, control transfers to 420 as the reliability of the boot code 208 has not been verified since the boot code 208 may have been changed. If 408 is true, the HSM 232 maintains the allow boot indicator 220 in the first state at 412, and control continues with 416.

The actuator control module 212 executes the boot code 208 at 416 in response to the allow boot indicator 220 being in the first state. After executing the boot code 208, the actuator control module 212 executes code from the post-boot code 224, such as code for starting the engine 102 and controlling other engine actuators.

At 420, the HSM 232 executes the hash function on the boot code 208 to determine the hash value for the boot code 208. At 424, the HSM 232 determines whether the hash value is equal to the predetermined value. If 424 is true, the HSM 232 sets the allow boot indicator 220 to the first state and sets the change requested indicator to the second state at 428. Control then continues with 416. The change requested indicator 240 being in the second state indicates that the reliability of the boot code 208 has been verified since a last request to change the boot code 208 was received. The change requested indicator 240 will remain in the second state until a next request to change the boot code 208 is received. As such, the boot code 208 can be executed for future boot requests (until a next request to change the boot code 208 is received) without the performance of the hash code.

If 424 is false, the hash value is different than the predetermined value, so the HSM 232 sets the allow boot indicator 220 to the second state at 432. Execution of the boot code 208 is disabled when the allow boot indicator 220 is in the second state. At 436, the HSM 232 may set the boot fault indicator 244 to the first state. The monitoring module 248 may take one or more remedial actions when the boot fault indicator 244 is in the first state, such as illuminating the MIL 252.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects.

The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A boot control system for a vehicle, comprising:
a hardware security module that transitions a first signal from a first state to a second state and transitions a second signal from a first state to a second state when a request to change boot code is received and that, in response to receipt of a boot request:
 (i) when the first signal is in the second state:
  executes a hash function on the boot code to produce a hash value;
  transitions the first signal from the second state to the first state when the hash value is equal to a predetermined value; and
  transitions the second signal from the second state to the first state when the hash value is equal to the predetermined value; and
 (ii) when the first signal is in the first state and the second signal is in the first state:
  does not execute the hash function; and
  maintains the second signal in the first state; and
an actuator control module that, in response to the receipt of the boot request:
 executes the boot code when the second signal is in the first state;
 controls one or more actuators of the vehicle after executing the boot code; and
 does not execute the boot code when the second signal is in the second state.

2. The boot control system of claim 1 wherein, when the first signal is in the first state and the second signal is in the second state, the hardware security module:
executes the hash function on the boot code to produce a hash value; and
transitions the second signal from the second state to the first state when the hash value is equal to the predetermined value.

3. The boot control system of claim 1 wherein when the hash value is not equal to the predetermined value, the hardware security module maintains the second signal in the second state.

4. The boot control system of claim 3 wherein, when the hash value is not equal to the predetermined value, the hardware security module indicates that a fault is present in the boot code.

5. The boot control system of claim 4 further comprising a monitoring module that illuminates a malfunction indicator lamp (MIL) when the hardware security module indicates that the fault is present in the boot code.

6. The boot control system of claim 1 further comprising a power module that supplies power to the hardware security module before supplying power to the actuator control module.

7. The boot control system of claim 1 wherein the hardware security module maintains the second signal in the first state until a second request to change the boot code is received.

8. The boot control system of claim 1 further comprising an input/output port,
wherein the hardware security module receives the request to change the boot code from a device that is independent of the vehicle via the input/output port.

9. The boot control system of claim 1 further comprising a wireless transceiver,
wherein the hardware security module receives the request to change the boot code from a device that is independent of the vehicle via the wireless transceiver.

10. A boot control method for a vehicle, comprising:
using a hardware security module, when a request to change boot code is received:
   transitioning a first signal from a first state to a second state; and
   transitioning a second signal from a first state to a second state;
using the hardware security module, in response to receipt of a boot request:
   (i) when the first signal is in the second state:
      executing a hash function on the boot code to produce a hash value;
      transitioning the first signal from the second state to the first state when the hash value is equal to a predetermined value; and
      transitioning the second signal from the second state to the first state when the hash value is equal to the predetermined value; and
   (ii) when the first signal is in the first state and the second signal is in the first state:
      not executing the hash function; and
      maintaining the second signal in the first state; and
using an actuator control module, in response to the receipt of the boot request:
   executing the boot code when the second signal is in the first state;
   controlling actuation of one or more actuators of the vehicle after executing the boot code; and
   not executing the boot code when the second signal is in the second state.

11. The boot control method of claim 10 further comprising, when the first signal is in the first state and the second signal is in the second state:
   executing the hash function on the boot code to produce a hash value; and
   transitioning the second signal from the second state to the first state when the hash value is equal to the predetermined value.

12. The boot control method of claim 10 further comprising, when the hash value is not equal to the predetermined value, maintaining the second signal in the second state.

13. The boot control method of claim 12 further comprising, when the hash value is not equal to the predetermined value, indicating that a fault is present in the boot code.

14. The boot control method of claim 13 further comprising illuminating a malfunction indicator lamp (MIL) in response to the indication that the fault is present in the boot code.

15. The boot control method of claim 10 further comprising supplying power to the hardware security module before supplying power to the actuator control module.

16. The boot control method of claim 10 further comprising maintaining the second signal in the first state until a second request to change the boot code is received.

17. The boot control method of claim 10 further comprising receiving the request to change the boot code from a device that is independent of the vehicle via a physical input/output port.

18. The boot control method of claim 10 further comprising receiving the request to change the boot code from a device that is independent of the vehicle via a wireless transceiver.

* * * * *